United States Patent [19]

Reed et al.

[11] 3,987,225

[45] Oct. 19, 1976

[54] DRY TRANSFER MATERIALS CHARACTERIZED BY TRANSFER-FACILITATING DISCONTINUITY IN THE ADHESIVE LAYER THEREOF

[75] Inventors: Kenneth James Reed; David Wellings Pointon, both of London, England

[73] Assignee: E. T. Marler Limited, London, England

[22] Filed: Jan. 14, 1975

[21] Appl. No.: 540,883

[30] Foreign Application Priority Data

Jan. 16, 1974 United Kingdom .............. 01976/74

[52] U.S. Cl. .................................... 428/43; 156/85; 156/240; 427/147; 428/195; 428/354; 428/914

[51] Int. Cl.[2] ...................... B32B 3/10; B32B 27/16; C09J 7/02

[58] Field of Search .............................. 117/3.1–3.6; 161/406 T, 167, 413; 156/84, 85, 240; 427/147; 428/43, 136, 155, 131, 177, 194, 195, 354, 343, 914

[56] References Cited

UNITED STATES PATENTS

| | | | |
|---|---|---|---|
| 3,190,788 | 6/1965 | Loos | 161/167 |
| 3,212,913 | 10/1965 | MacKenzie | 117/3.1 |
| 3,298,850 | 1/1967 | Reed et al. | 117/3.1 |
| 3,432,376 | 3/1969 | Reed et al. | 161/406 T |
| 3,459,626 | 8/1969 | Morgan | 161/406 T |
| 3,515,270 | 6/1970 | Tonn et al. | 156/85 |
| 3,741,787 | 6/1973 | Tordjman | 117/3.1 |

FOREIGN PATENTS OR APPLICATIONS

| | | | |
|---|---|---|---|
| 589,276 | 12/1959 | Canada | 156/240 |

*Primary Examiner*—J.C. Cannon
*Attorney, Agent, or Firm*—Edwin E. Greigg

[57] ABSTRACT

A dry transfer sheet of the kind described comprising a carrier sheet, at least one design carried by said carrier sheet and releasably bonded thereto, and a layer of shrinkable pressure sensitive adhesive covering said design and overlapping said carrier sheet to stress the edges of the design to cause at least a reduction of bonding between the edges of the design and the carrier sheet.

10 Claims, No Drawings

DRY TRANSFER MATERIALS CHARACTERIZED BY TRANSFER-FACILITATING DISCONTINUITY IN THE ADHESIVE LAYER THEREOF

The present invention relates to dry transfer materials of the kind comprising a carrier sheet, one or more designs to be transferred to a receiving surface and carried on the front surface of said carrier sheet and an adhesive layer provided on said design whereby on application of pressure to the back surface of the carrier sheet over the selected design, transfer of the design from the carrier sheet to a receiving surface is effected so that the design adheres to such receiving surface.

In this way, pictures, symbols, numerals, typographical characters or photographically reproduced images in a suitably transferable design material, typically dry ink, constituting the designs may be transferred from a transfer support sheet or carrier sheet on which they are formed on to a final surface or object generally referred to as a receiving surface and are caused to adhere to the receiving surface by the layer of adhesive on the exposed surface of the design itself. The transfer operation is carried out by the application of pressure to the back of the carrier over the selected design while the carrier and design is in contact with the receiving surface.

These dry transfer materials and their modus operandi are generally well known and have been used for a number of years. These materials have the advantage that no heat or liquid is necessary to carry out the transfer operation, the principle advantage of this known process is that a design on a transfer sheet with numerous designs may be selected and transferred accurately to a defined position on the receiving surface and the adhesives and character of the design and the carrier sheet may be selected in such a way that transfer of the design to a receiving surface is not effected by the application of only light pressure such as finger pressure to the back surface of the carrier sheet over the design and accordingly the dry transfer material maybe placed on top of the receiving surface and moved about until the design is accurately positioned and then pressure applied to the back surface of the carrier sheet, that is to say, the surface remote from the surface of the carrier sheet carrying the designs, over the selected design to effect the necessary transfer. The pressure may be applied by any convenient means available to apply a pressure sufficiently above a threshold to effect transfer, and typical means of application are pressure pads, blades, and platen press, pressure roller, and where a small design is to be transferred high pressure may be applied by the stroke of a ballpoint pen, pencil, stylus or finger nail, and for the purposes of this specification reference to the application of pressure is to be understood to include all of these methods.

The major problem with dry transfer materials at the present time is the problem of the application of the adhesive to the design. Two techniques are possible; one is that in which a layer of adhesive is carried both over the exposed surface of the design and over the adjacent exposed surfaces of the carrier sheet; the other is where an attempt is made to apply adhesive merely to the surface of the design itself.

The difficulties of the latter operation arise chiefly in obtaining registration of the application of the adhesive with the design on the carrier sheet. It is generally accepted that the accuracy of registration of the application of adhesive can not be better than 0.1 mm. and it will be apparent, therefore, that when the design comprises a number of fine lines, such registration will be virtually impossible, and as a result portions of the design may be completely devoid of adhesive with the result that it will not transfer.

One advantage of the dry transfer materials of the kind described is that with appropriate selection of design materials and adhesives they have a semi-permanent character and are generally eraser-proof. If, therefore, a small portion of an edge of a design or a line in a design were completely devoid of adhesive then it would be quite clear that frictional action on that portion of the design from say an eraser, would result in a lifting of the edge of the line from the receiving surface with resultant damage to the design per se.

The problem of the application of adhesive both to the design and to the surrounding areas of the carrier sheet surface is that on transfer of the design, the adhesive layer does not separate cleanly and shear precisely at the periphery of the design with a result that portions of adhesive extend from the periphery of the design as particles or strings. These collect dirt and become unsightly, and subsequent processing can frequently render the exposed portions of the adhesive very tacky, with a result that additional material can adhere to the exposed adhesive and frictional action can result in damage to the design per se.

In order to overcome this problem, it has been proposed to provide a carrier sheet having a surface which has a particular interaction with a solvent of the adhesive whereby on application of the adhesive thereto, solvent interaction takes place to reduce the ability of the adhesive to adhere to a receiving surface.

While this results in a certain amount of "cleaning up" of the periphery of the design, nevertheless portions of adhesive are still significantly visible about the periphery of the design.

According to the present invention, there is provided a dry transfer sheet of the kind described comprising a carrier sheet, at least one design carried by said carrier sheet and releasably bonded thereto, and a layer of shrinkable pressure sensitive adhesive covering said design and overlapping said carrier sheet to stress the edges of the design to cause at least a reduction of bonding between the edges of the design and the carrier sheet.

Thus, in preparation of the transfer sheet the film strength of the adhesive layer is reduced at the edges of the design. This reduction in film strength may extend to the extent of a physical discontinuity of the adhesive at the design edges.

The adhesive layer therefore exists in a latent presheared condition in the transfer sheet achieved by chemical action of the adhesive at the design edges during preparation of the transfer sheet. The adhesive may interact with designs of particular chemical composition to create stress at the design edges so that a reduction in adhesion of the design edges occurs. This may exist as a latent reduction of adhesion or even a physical separation of the design edges from the carrier sheet.

The essence of the invention is, therefore, the provision of an edge stress either of the design per se or of the adhesive layer to produce at least a reduction of edge bonding of the design to the carrier sheet. In one embodiment of the present invention the bonding between the edges of the design and the carrier sheet may be reduced to zero and the edges of the design may even lift or curl. The edge stress may result in a stressing of the adhesive layer along the periphery of the design thus resulting in more ready separation of the adhesive layer along the design boundary on transfer.

By the term "shrinkable adhesive" as used herein is to be understood an adhesive which shrinks or contracts on drying.

The reduced adhesive film strength at the design edges in transfer sheets of the present invention can be observed by physically removing a design from the transfer sheet while observing the design edge with a microscope. The removed design will have a clean edge free from strings or particles of adhesive. Transfer sheets of the prior art rely on mechanical shear of the adhesive during the transfer operation and these show pronounced strings or particles of adhesive attached to the design edges when a design is removed. The transfer sheets of the prior art with mechanically shearable adhesive have the added disadvantage that an adhesive which requires mechanical shear inhibits transfer by restraining the edges of the designs from transferring. This frequently causes breaking of the design during transfer and strong mechanical action is required such as pronounced local stretching of the carrier sheet, to cause transfer of the design.

The reduction of adhesive film strength at the periphery of the designs provides an adhesive with two separate parts, one part in exact register with the design and one part namely the excess adhesive being contiguous with the carrier sheet. The excess adhesive is adhered strongly to the carrier sheet and does not transfer to the receiving surface.

The reduction of the edge adhesion of the design and the reduction of the adhesive film strength at the design edges are produced, during preparation of the transfer sheet and transfer of the design does not depend on users' skill to produce transfer by a stretched release-type mechanism as is necessary in some of the transfer sheet materials hitherto employed.

The carrier sheet may be an unsupported plastic film or may be a coated paper or film, or film/paper or film/film laminate. It is preferred that the carrier sheet be transparent to assist accurate positioning of the design prior to transfer. The carrier sheet may have a matt or semi-matt surface which is particularly desirable for typographic transfer materials to provide transferred ink designs with a corresponding matt finish which reduces specular reflections when used original art work or reproduction photographically.

The film strength and flexibility of the carrier sheets are preferably such as to enable the entire design to be transferred without breaking or distortion.

The carrier sheet may be formed of one or more of polystyrene, polystyrene butadiene, high density polyethylene, polypropylene, acrylonitrilebutadiene-styrene (ABS), polyvinyl chloride, polyvinylidine chloride, polycarbonate, cellulose acetate, polyethylene terephthalate or laminates or coatings of the above on paper.

The carrier sheets of unsupported film may be nonoriented or alternatively may be mono- or bi-axially oriented and the carrier sheets preferably have a thickness of 0.1 to 0.5 mm. and preferably within the range of 0.075 to 0.125 mm.

The design is preferably produced from printing ink based on a polymer or polymer-plasticiser combination having flexibility and film forming properties. The ink preferably also has low adhesion to the carrier sheet being used.

Suitable ink polymers may comprise one or more cellulose derivatives particularly, cellulose nitrate and polyvinyl chloride, polyvinyl acetate polymers and copolymers, acrylic polymers and copolymers, chlorinated polyvinyl chloride, alkyd resins, epoxy resins and polyurethanes.

Photo designs may be produced from polymers which are light or ultraviolet sensitive or material such as gelatin or polyvinyl acetate/polyvinyl alcohol may be sensitised with dichromate or diazo compounds. The photosensitive materials may contain colouring matter to give coloured designs.

The plasticiser to polymer ratio may be adjusted to control the level of adhesion of the dry ink design to the carrier sheet being used and also to control the interaction of adhesive with the ink design. A high plasticiser ratio generally increases the adhesion of the ink design to the carrier sheet and also reduces adhesive interaction because the ink is softer and is able to absorb the stress caused by adhesive contraction. A low plasticiser ratio gives an ink with reduced adhesion to the carrier sheet and shows high adhesive interaction which gives reduced ink design edge adhesion and may even cause physical separation of the ink design edges from the carrier sheet.

It is found that general adhesion of an ink design with a particular plasticiser to polymer ratio is increased if solvents in the ink attack (swell or etch) the carrier sheet. A low ink design adhesion is generally preferred. Solvent attack is avoided by the selection of solvent which do not attack the carrier sheet being used. A correct test for design adhesion is to lift one edge of the design before adhesive is applied and peel away the design. It should pull away intact. Alternatively, a piece of adhesive tape may be applied to the ink design and it should be possible to peel the entire design intact from the carrier sheet.

The film strength and flexibility of the design are such as to enable the entire design to be transferred without breaking or distortion. The application of pressure as defined above to the back of the carrier sheet over the design application particularly on large designs may not always be evenly applied, in consequence, those parts of the design which have not been adhered to the receiving surface by the result of the applied pressure must be capable of being peeled from the support by those portions of the design that have so adhered. To achieve the required film strength, the physical thickness of the dry design is dependent on this. A thickness of 0.005mm. has been found to give satisfactory results but clearly the optimum thickness depends on the design composition and shape. Designs produced by printing processes may be built up from several successive ink applications and it is sometimes useful to apply clear ink by one printing process such as screen printing and thereafter applying coloured and overlapping ink work by the same or other processes such as off set lithography, flexographic, letterpress or electrostatic processes. In photographically formed designs the same requirement of film strength and flexibility exist, and may be achieved by the thickness and composition of the design.

The required reduction in film strength of the adhesive at the design edges is obtained by an adhesive which shrinks or contracts on drying.

Ink designs which resist adhesive contraction have a low plasticiser to polymer ratio and this increases ink and adhesive interaction and increases the amount of adhesive film strength reduction even to the extent of a total physical discontinuity of the adhesive and a total presheared adhesive. Reduction of adhesive film strength is also affected by the rate of drying the adhesive, fast drying with heat giving less effect than slow drying at ambient temperature. The effect of plasticiser to polymer ratio using cellulose nitrate as polymer and dibutyl phthalate as plasticiser, on the adhesive discontinuity at the design edge on two carrier sheets is shown below. Ink design edge adhesion reduction occurs similarly to adhesive discontinuity.

| CARRIER SHEET | PLASTICISER TO POLYMER RATIO | | | |
|---|---|---|---|---|
| | 100/100 | 82/100 | 55/100 | 18/100 |
| HDPE | Good | Excellent | Excessive | Excessive |
| HIPS | Nil | Slight | Very Good | Excellent |

HDPE High density polyethylene
HIPS High impact polystyrene

Ratings refer to degree of physical discontinuity in the adhesive and degree of ink design edge adhesive reduction.

Excessive indicates that the edges of the ink design are separated from the carrier sheet and there is a distinct gap in the adhesive and this could cause accidental transfer of the ink design, e.g. by finger pressure, whereas transfer only under high pressure is generally required.

The adhesive layer may be based on a tackified elastomer or tacky polymer, and may be selected from polyvinyl alkyl ethers, natural rubber particularly crepe rubber, synthetic rubbers, acrylic polymers and copolymers, polyisobutylene, silicone polymer, polyurethane.

Modifying or tackifying resins may be selected from terpene resins, ketone resins, ester gum, hydrocarbon resins.

A proportion of a wax may be also incorporated, selected from microcrystalline wax, hydrogenated castor oil, polyethylene wax.

The adhesive polymer, resin and waxes may be dissolved in an organic solvent or mixture of solvents. The mixture of solvents may include in the solvent mixture a small proportion of an active solvent for the design per se. In order to enable the adhesive to interact more strongly with the design to increase design edge adhesion reduction and adhesive preshear by contraction applied by the adhesive per se, a small proportion of solvent for the design material may be introduced in the adhesive.

The adhesive contraction effect may be effected by dispersing insoluble solid powders in the liquid adhesive composition at a high concentration. Suitable solid powders are alkyl ammonium montmorrillonite, precipitated or aerogel silica, polytetrafluorethylene as a fine powder, fine particle talc, china clay, barytes, blanc fixe, calcium carbonate, aluminium hydroxide, silicates, zinc oxide and aluminium stearate. Although it is not normal practice to disperse solid powders at high concentrations in such adhesives since it is generally believed that adhesive properties will be reduced or eliminated, it has been found that the solids materials indicated above may be incorporated at sufficiently high concentration to obtain a contraction effect without substantial lowering of adhesive properties.

The adhesive layer may be applied to the carrier sheet and design by any of the known processes to produce a matt translucent film produced on drying the adhesive in which the close-packing of the dispersed solid particles within the adhesive aids the contraction effect.

The adhesive should possess adequate peel bond strength to a wide range of receiving surfaces under pressure to provide adequate design adhesion and transfer. The adhesive peel bond under light pressure should be limited so that accidental transfer does not occur. The extent of the contraction of the adhesive is dependent upon the adhesive composition, the adhesive thickness and the rate of drying of the adhesive and solvent action of the adhesive on the design.

A measure of the solvent activity can be obtained by a contraction test in which the wet adhesive is applied to a plastic film comparable in thickness to the design and observing the degree of curl development developed on drying both slow and fast drying conditions. It is preferred that the adhesive layer is dried relatively rapidly and the extent of the stressing or preshear of the adhesive layer in accordance with the present invention can to some extent be controlled by the rate at which the adhesive drying process is conducted.

Following is a description by way of example only of methods of carrying the invention into effect.

EXAMPLE 1

A transfer sheet material was formed from the following:

Carrier sheet: 0.125 mm biaxially orientated high impact polystyrene. Design: Black ink for screen printing as follows:

| | |
|---|---|
| Nitrocellulose, high nitrogen, low viscosity grade | 22 |
| Di-n-butyl phthalate | 4 |
| Linear polyester plasticiser | 6 |
| Ethyleneglycol mono-isopropyl ether | 60 |
| Carbon Black | 8 |
| | 100 |
| Polymer/Plasticiser | 100/45 |

This ink is printed to give a dry film thickness of 5–10 mym (micron). Wet prints may be air dried or hot air dried provided the temperature of the film does not exceed 80° C.

| Adhesive | |
|---|---|
| Polyvinyl isobutyl ether | 10 |
| Polyvinyl ethyl ether high m.wt | 3 |
| Polyvinyl octadecyl ether | 2 |
| Aerogel silica 10–12 millimicron | 5 |
| Ethylene glycol mono isopropyl ether | 10 |
| Alophatic hydrocarbon solvent | 70 |
| | 100 |
| Polymer/solid powder | 100/38 |
| Active Design solvent | 10% |

The adhesive is screen printed to give a dry coating weight of 1.4 g.s.m. and is allowed to dry slowly at 20°–25° C. The adhesive contraction occurs to a significant degree during the final 10% solvent evaporation. The edges of the Design lift and show noticeable colour change (greying) when viewed through the Support.

Under a microscope the adhesive Pre-Shear is easily visible at low magnification using reflected light. If the adhesive is air dried at 40°–80° C in a jet of hot air immediately after printing then the contraction is such that it is only just visible.

EXAMPLE 2

A transfer sheet material was formed as follows:

Carrier Sheet: 0.125 mm high density blown or cast polyethylene film, density 0.96. The film was untreated, i.e. not subject to flame treatment or corona discharge.

Design in Black Ink for Screen Printing:

| | |
|---|---|
| Nitrocellulose, high nitrogen, low viscosity | 15.2 |
| Di-n-butyl phthalate | 6.7 |
| Linear polyester plasticiser | 12.2 |
| Carbon Black | 6.0 |
| Diacetone alcohol | 8.5 |
| Ethylene glycol mono ethyl ether | 51.4 |
| | 100.0 |

This ink viscosity 80 poise at 25° C is printed to give a dry film thickness 7–12 mym. Prints may be air dried or hot air dried at 60°–100° C air temperature.

| | | |
|---|---|---|
| | Polymer/Plasticiser | 100/125 |
| Adhesive: | | |
| | Polyvinyl ethyl ether, low m.wt | 11 |
| | Polyvinyl ethyl ether, high m.wt | 2 |
| | Alkyl Ammonium Montmorillonite | 1 |
| | Aerogel silica 10–12 millimicron | 5 |
| | Ethylene glycol mono ethyl ether | 15 |
| | Aliphatic hydrocarbon solvent b.p 150–180° C. | 66 |
| | | 100 |
| | Polymer/solid powder ratio | 100/46 |
| | Active solvent for Design | 15% |

Print by screen process to give dry weight of adhesive 1.2–1.9 gsm (approx. 1.2–1.9 mym).

Adhesive has slight finger tack and feels soft and rubbery. The contraction of adhesive on temperature drying gives visible edge colour change and adhesive pre-shear. Hot air drying at 60° C. gives no visible edge colour change but the adhesive pre-shear by a discontinuity at the ink design edges is visible under the optical microscope.

In this case ink release on application of a stretching force occurs first at the edges, as in Example 1 but due to the very low adhesion of the design to the Carrier Sheet the internal design area can be released by excessive Carrier Sheet stretching but such mechanism is not used in normal transfer.

EXAMPLE 3

Example 1 was repeated using the following adhesive composition:

| | |
|---|---|
| Alkyl Ammonium Montmorillonite | 4.0 |
| 2 - Propanol | 4.0 |
| Finely divided polytetrafluoroethylene of particle size less than 15 micron | 4.0 |
| Polyvinyl ethyl ether, 20 % solution in an aliphatic hydrocarbon solvent as below | 40.0 |
| Aliphatic hydrocarbon, b.pt 150–180° C and containing not more than 10 % aromatic solvent | 48.0 |
| | 100.0 |
| Polymer/Powders | 100/100 |

-continued

Print by screen process to a dry coating weight 1.2 – 1.7 gsm.
Adhesive has no finger tack and feels dry to the touch.

This adhesive has no active solvent for the Ink Designs of Example 1 but the edge adhesion of the Design is reduced. If 10% of active solvent is added the edge reduction effect is magnified.

EXAMPLE 4

It will be noted that the adhesive powder ratios used in Examples 1–3 are:

| | |
|---|---|
| Example 1 | 100/38 |
| Example 2 | 100/46 |
| Example 3 | 100/100 |

The lower ratio is used when there is a low general adhesion of the design to the carrier sheet, for example on HDPE film, and where the adhesive is air dried and has a strong solvent action on the design. With aerogel silica the design edge adhesion reduction effect may be observable at a minimum ratio of 100/15. With a less active dispersed powder, such as alkyl ammonium montmorillonite the minimum ratio to provide a detectable effect is 100/25 with the above ink designs.

The upper limit for alkyl ammonium montmorillonite is 100/300, the limit being the printability of the ink.

Repetition of Examples 1 to 3 with an increase of adhesive dry thickness in the range of 1.0–7.5 mym gives a progressive increase of edge reduction adhesion effect. At 1.0 mym dry thickness the effect is hardly detectable and the transfer properties of the adhesive are poor. As thickness of the adhesive increases, the ratio of polymer/powder may be reduced to maintain satisfactory edge adhesion reduction effect due to the increased effect or the thicker adhesive.

EXAMPLE 5

A transfer sheet material was formed from the following:

Carrier sheet: Polyester film 75 mym gauge.

| | | |
|---|---|---|
| Design: | | |
| | Polyvinylacetate - polyvinyl alcohol copolymer 40% solids in water emulsion | 93 |
| | Ammonium Dichromate | 2 |
| | Carbon Black | 5 |
| | | 100 |

Coated to give a dry film thickness of 12.5 mym. After dry at 30° C in the dark, the photosensitive sheet is exposed to a positive using a quartzhalogen light source. The unexposed polymer is washed away by a water spray and the photo design which remains is dried and hardened in air at 65° C.

Adhesive: The adhesive of Example 2 is coated over the design and Carrier Sheet to produce a dry coating thickness of 10 mym, the adhesive containing 15% active solvent for the design.

Transfer: The design edges have reduced adhesion and excellent transfer to a receiving Surface under pressure is obtained without stretch release mechanism.

We claim:

1. A dry transfer sheet comprising a carrier sheet, at least one design carried by said carrier sheet and releasably bonded thereto, and a layer of pressure sensitive adhesive covering said design and overlapping said carrier sheet which has been shrunk to stress the edges of the design to cause a reduction of bonding between the edges of the design and the carrier sheet, wherein the layer of adhesive has contracted to cause a discontinuity between the adhesive applied to the design and the adhesive applied to the carrier sheet at the periphery of the design.

2. A sheet as claimed in claim 1 wherein the material of the design is sufficiently resilient to yield under the stress of the contracted adhesive.

3. A sheet as claimed in claim 1 wherein the bonding between the edge portion of the design and the carrier sheet is reduced to zero.

4. A sheet as claimed in claim 1 wherein the carrier sheet is an unsupported plastic film, a coated paper or film, or a film/paper or a film/film laminate.

5. A sheet as claimed in claim 1 wherein the design is produced from printing ink based on a polymer plasticiser composition having flexibility and film-forming properties.

6. A sheet as claimed in claim 1 wherein the ink polymer is selected from the group consisting of cellulose nitrate, polyvinylchloride, polyvinylacetate polymers and copolymers, acrylic polymers and copolymers, chlorinated polyvinyl chloride, alkyd resins, epoxy resins and polyurethanes.

7. A sheet as claimed in claim 1, wherein the layer of adhesive contiguous the edge of the design is highly stressed by the incorporation of a high concentration of dispersed solid particles.

8. A sheet as claimed in claim 1 wherein the adhesive layer is selected from the group consisting of polyvinylalkyl ethers, natural rubber, synthetic rubbers, acrylic polymers and copolymers, polyisobutylene silicone polymers and polyurethane.

9. A sheet as claimed in claim 8 wherein the adhesive includes a proportion of a modifying resin selected from the group consisting of terpene resins, ketone resins, ester gum and hydrocarbon resin.

10. A sheet as claimed in claim 8 wherein the adhesive includes a proportion of wax selected from the group consisting of microcrystalline was, hydrogenated castor oil and polyethylene wax.

* * * * *